(12) United States Patent
Higuchi

(10) Patent No.: US 6,993,969 B2
(45) Date of Patent: Feb. 7, 2006

(54) VIBRATION TYPE OF MICRO GYRO SENSOR

(75) Inventor: Hirofumi Higuchi, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/808,544

(22) Filed: Mar. 25, 2004

(65) Prior Publication Data

US 2004/0231419 A1   Nov. 25, 2004

(30) Foreign Application Priority Data

Mar. 27, 2003   (JP)   ............... 2003-088340

(51) Int. Cl.
*G01C 19/56*   (2006.01)

(52) U.S. Cl. ................ 73/504.14; 73/504.12

(58) Field of Classification Search ............. 73/504.02, 73/504.04, 504.12, 504.14, 504.15, 504.16
See application file for complete search history.

(56) References Cited

U.S. PATENT DOCUMENTS

| 5,911,156 | A | 6/1999 | Ward et al. | |
| 6,666,091 | B2 * | 12/2003 | Hatanaka et al. | ........ 73/504.16 |
| 6,705,151 | B2 * | 3/2004 | Nozoe et al. | ................ 73/1.37 |

FOREIGN PATENT DOCUMENTS

| JP | 10-221083 | 8/1998 |
| JP | 2001-513885 | 9/2001 |

* cited by examiner

*Primary Examiner*—Helen Kwok
(74) *Attorney, Agent, or Firm*—Posz Law Group, PLC

(57) ABSTRACT

An oscillation type of micro gyro sensor equipped with two vibrators is provided. The gyro sensor has a monitoring electrode, a signal processor, and a driving electrode attached to both the vibrators. The monitoring electrode monitors a vibration of only one of the two vibrators to output signal indicative of the monitored vibration. The signal processor drives the two vibrators in mutually opposite phases, by using the signal from said monitoring electrode. The driving electrode drives both the vibrators on the basis of the two driving signals.

3 Claims, 2 Drawing Sheets

VIBRATION TYPE OF MICRO GYRO SENSOR

BACKGROUND OF THE INVENTION

1. Technical Field

The present invention relates to a vibration type of micro gyro sensor equipped with two vibrators.

2. Related Art

In general, a gyro sensor has been used in various applications such as attitude control system. The gyro sensor is classified into many types including a vibration type of micro gyro sensor equipped with a vibrator.

For driving the vibration type of gyro sensor, it is general that the vibrator is forced to vibrate at a resonance frequency thereof. The reason lies in improving sensitivity to sense angular velocity. When being vibrated at the resonance frequency, the vibrator shows a vibrational amplitude multiplied by a Q-value of the vibrator, thus raising a vibration velocity of the vibrator depending on the Q-value. This rise in the vibration velocity will improve the sensitivity for angular velocity.

A linear vibration type of micro gyro sensor falls into the vibration type of micro gyro sensor. In such a linear sensor, two vibrators are generally used. Specifically, to reduce an anti acceleration sensitivity, the two vibrators are driven to vibrate in mutually opposite phases and two acceleration signals from the two vibrators are subjected to mutual subtraction between those two acceleration signals, thus canceling an acceleration component. To gain this canceling effect, the two vibrators should be vibrated at the same vibration frequency.

In FIG. 1, a conventional two-vibrator type of micro gyro sensor 1, which is categorized in the linear vibration type of micro gyro sensor, is exemplified. The gyro sensor 1 shown in FIG. 1 includes two vibrators 11 and 21, each of which is supported by driving beams 12 (22) so that each vibrator can easily vibrate in an X-axis direction defined in FIG. 1. To each vibrator 11 (21), there are formed monitoring electrodes 13 (23) to monitor the vibration of the vibrator 11 (21) and movable electrodes 11a (21a) to be opposed to driving electrodes 14 and 15 (24 and 25) in a comb-shaped form. References 16a, 16b and 26a and 26b shown in FIG. 1 are detecting electrodes for detecting a signal from the sensor 1.

To both of the driving electrodes 14 of one vibrator 11 and the driving electrodes 25 of the other vibrator 21, a driving signal of which frequency is equal to the resonance frequency is applied by a self-energizing oscillator 30. In addition, to the driving electrodes 15 of one vibrator 11 and the driving electrodes 24 of the other vibrator 21, the opposite-phase driving signal to the above driving signal is applied through an inverter 31 by the self-energizing oscillator 30.

When each of the vibrators 11 and 21 vibrates in the X-axis direction, an opposed area S formed among the electrodes of each vibrator 11 (21) varies, thereby a capacitor C between the electrodes varies responsively based on the relationship of $C \propto \in \cdot S/d$ ($\in$; dielectric constant, d; distance between the electrodes). The vibrations of the vibrators 11 and 21 are monitored by the monitoring electrodes 13 and 23, respectively, to subtract monitored signals one from the other by a differential amplifier 32. A resultant subtracted signal is fed back to the self-energizing oscillator 30 to drive both the vibrators 11 and 21 at the same frequency signal (but the signals applied to both the vibrators 11 and 21 are mutually opposite in their phases, thanks to the inverter 31 intervening in the path to the other vibrator 21).

However, the above two-vibrator type of micro gyro sensor is still unsatisfactory in its performance. Manufacturing such a sensor frequently involves irregularities in sizes or others. Such irregularities, which include a quantity of mass of the vibrators and sizes of the driving beams, often cause a difference in the resonance frequencies of the vibrators 11 and 21. When such a difference is caused, applying the signal resultant from the addition of the monitoring signals from the two vibrators 11 and 21 to both the vibrators 11 and 21 will result in that the two vibrators 11 and 21 are forced to self-oscillate at a signal of which frequency lies between the two resonance frequencies given to the two vibrators 11 and 21.

On top of this, in a situation where the Q-value of each vibrator is high to make it larger the difference between the two resonance frequencies, the two vibrators 11 and 21 are forcibly driven at a smaller amplitude when receiving the driving signal whose frequency lies between the two resonance frequencies. As a result, in such cases, the two vibrators cannot be self-oscillated.

SUMMARY OF THE INVENTION

The present invention has been made with due consideration to the foregoing difficulty, and an object of the present invention is to provide a vibration type of micro gyro sensor capable of establishing self-oscillation steadily even if there is a considerably large difference between the resonance frequencies of two vibrators.

In order to achieve the above object, there is provided an oscillation type of micro gyro sensor equipped with two vibrators. The gyro sensor comprises a monitoring electrode monitoring a vibration of one of the two vibrators to output signal indicative of the monitored vibration; a signal processor configured to drive the two vibrators in mutually opposite phases, by using the signal from said monitoring electrode; and a driving electrode, attached to both the two vibrators, driving both the vibrators on the basis of the two driving signals.

In this configuration, a monitoring signal for driving both the vibrators can be acquired from one of the two vibrators. Using the acquired monitoring signal, two driving signals of mutually opposite phases are produced to drive both the vibrators, whereby a resonance frequency of only the one of the vibrators is reflected into the two driving signals. Driving both the vibrators with those two driving signals causes both the vibrators to vibrate to exhibit different oscillations amplitudes. There is however no problem, because sensitivity to acceleration applied to this sensor does not depend on levels of oscillation amplitude. Even when there is a considerably large difference between the resonance frequencies of the two vibrators, the self-oscillation can be established at the two vibrators in a steady fashion.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENT

Referring to the accompanying drawings, a preferred embodiment of the present invention will now be described.

Figure 2:
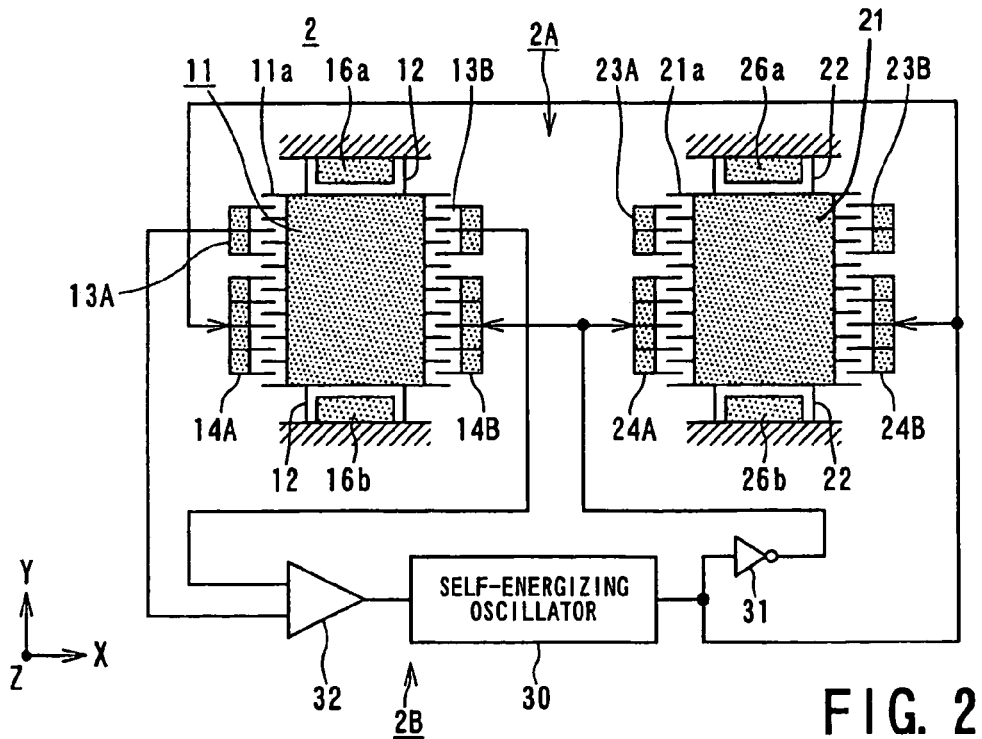
FIG. 2 is a diagram outlining the configuration of a two-vibrator type of micro gyro sensor according to an embodiment of the present invention.

FIG. 2 shows an outlined configuration of a two-vibrator type of micro gyro sensor 2 according to the present embodiment.

Figure 1:
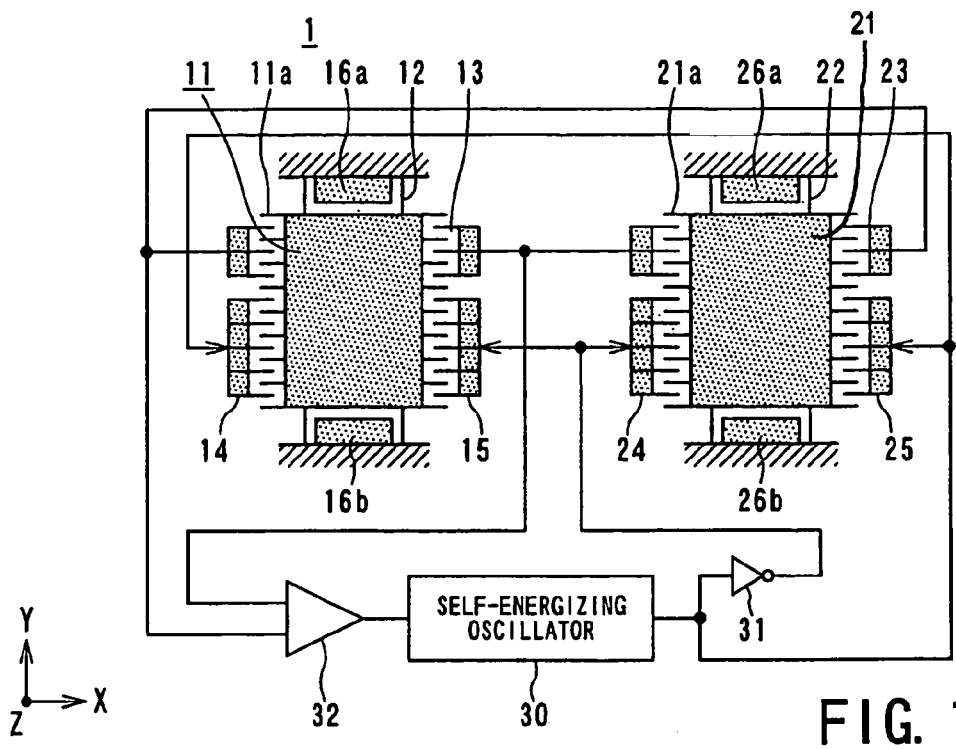
FIG. 1 is a diagram outlining the configuration of a conventional two-vibrator type of micro gyro sensor.

The present two-vibrator type of micro gyro sensor 2 is formed almost in a similar manner to that shown in FIG. 1, except the wiring to monitor displacements caused in this gyro sensor 2. By the way, for the sake of understanding in a comparative manner the differences from the conventional sensor 1 shown in FIG. 1, the references given to the components of this sensor 2 are to be the same as those in FIG. 1.

Like the conventional, the present micro gyro sensor 2 is equipped with a sensing unit 2A having two vibrators 11 and 21. Each of the two vibrators 11 and 21 is formed to have a plurality of movable electrodes 11a (21a). The movable electrodes 11a (21a) are extended, in a direction designated as the X-axis direction, longer than the vibrator body, thereby both ends of the electrodes 11a (21a) in the X-axis direction protrude in the form of comb teeth. The vibrators 11 and 21 are suspended between fixed members FU and FL using driving beams 12 and 22, respectively, to allow vibrations in the X-axis direction.

On both X-directional sides of each of the two vibrators 11 and 21, a pair of monitoring electrodes 13A and 13B (23A and 23B) are disposed. Practically, electrode plates of each monitoring electrode (for instance, 13A) are disposed to face, in an alternately nested fashion, X-directional one-sided ends of two or more of the protruded movable electrodes 11a (21a) with a predetermined gap between the electrode plates and the movable electrodes. Thus there is formed a capacitor between each monitoring electrode (for instance, 13A) and each end of movable electrode 11a (21a).

In a similar way to the above, on both X-directional sides of each of the two vibrators 11 and 21, a pair of driving electrodes 14A and 14B (24A and 24B) are disposed. Practically, electrode plates of each driving electrode (for instance, 14A) is disposed to face, in a alternately nested fashion, X-directional one-sided ends of the remaining ones of the protruded movable electrodes 11a (21a) with a predetermined gap between the electrode plates and the movable electrodes.

The present two-vibrator type of micro gyro sensor 2 is also equipped with a control unit 2B comprising a differential amplifier 32 composed of an operational amplifier, a self-energizing oscillator 30, and an inverter 31.

Only both of the monitoring electrodes 13A and 13B are connected to two input terminals of the differential amplifier 32. The output terminal of the differential amplifier 32 is connected to an input terminal of the self-energizing oscillator 30 of which output is branched into two ways. One way is routed, through the inverter 31, to both of one-side driving electrodes 14B of one vibrator 11 and one-sided driving electrodes 24A of the other vibrator 21. In contrast, the other way from the self-energizing oscillator 30 is directly routed to both of the remaining driving electrodes 14A of one vibrator 11 and the remaining driving electrodes 24B of the other vibrator 21. There are no electrical connections with the monitoring electrodes 13A and 13B attached to the vibrator 21.

Two detecting electrodes 16a and 16b (26a and 26b) are fixedly disposed to form capacitors residing between the detecting electrodes 16a and 16b (26a and 26b) and each of the vibrators 11 and 21, respectively.

Hence, in the two-vibrator type of micro gyro sensor 2 according to the present embodiment, signals are detected from one vibrator 11 through the monitoring electrodes 13A and 13B, and then fed back to the self-energizing oscillator 30. Hence, the self-energizing oscillator 30 applies, as a first driving signal, the same driving signal (produced in the form of a voltage signal) to both of the driving electrodes 14A of one vibrator 11 and the driving electrodes 24B of the other vibrator 21. Concurrently, the inverter 31 produces the driving signal supplied directly from the self-energizing oscillator 30 into a second driving signal whose phase is opposite to that of the first driving signal, that is, different from the first driving signal by 180 degrees. This second driving signal is fed to the driving electrodes 14B of one vibrator 11 and the driving electrodes 24A of the other vibrator 21.

The vibrator 21, which receives the second driving signals, is able to vibrate at its own resonance frequency. When acceleration is applied to the present sensor 2, the Coriolis forces caused at both the vibrators 11 and 21 are opposite to each other, because the two vibrators 11 and 21 vibrate in mutually opposite phases, though both the vibrators 11 and 21 displace in the same direction. Hence performing subtraction between the outputs of the monitoring electrodes 13A and 13B by the operational amplifier 12 makes it possible to cancel only an acceleration component from the output signals of the monitoring electrodes 13A and 13B.

Changes in the capacitances of the capacitors formed with the detecting electrodes 16a and 16b (and 26a and 26b), which depend on vibrations on the Coriolis forces, are detected by the detecting electrodes 16a and 16b (and 26a and 26b), respectively. The detected signals showing the changes are converted into corresponding voltage values by signal processors (not shown). Those voltage signals are processed into a desired type of detection signal, such as angular acceleration signal.

The operations and advantages of the present two-vibrator type of micro gyro sensor 2 will now be described compared to those of the conventional gyro sensor 1 shown in FIG. 2.

In the conventional sensor 1 shown in FIG. 2, when the two vibrators 11 and 21 have different resonance frequencies with each other, the two vibrators 11 and 21 should vibrate at an intermediate frequency between the two resonance frequencies. In general, to enhance sensitivity to angular velocity (i.e., to gain vibrational amplitude as large as possible), the Q-value of each of vibrators 11 and 21 is designed to be a larger amount. However, in cases where there is a difference between the two resonance frequencies due to different degrees of precision in manufacturing or various other factors, the two vibrators 11 and 21 are forced to vibrate at the intermediate frequency to exhibit smaller vibrational amplitude. As a result, changes in the capacitances formed by the monitoring electrodes 13 and 23 shown in FIG. 1 become smaller, so that no sufficient signal amplitude can be gained. Some such cases lead to failure in the operation of the self-energizing circuit 30 shown in FIG. 1.

In contrast, in the present two-vibrator type of micro gyro sensor 2 according to the present invention, which is shown in FIG. 1, the self-energizing oscillation can be ensured. To realize this, monitoring signals are acquired from only one of the vibrators 11 and 21, as shown in FIG. 1. In the present embodiment, only the one vibrator 11 provides the monitoring signals from its monitoring electrodes 13A and 13B. An alternative is that only the other vibrator 21 provides the monitoring signals from its monitoring electrodes 23A and 23B. The monitoring signals from only the one vibrator 11 are used to the self-energizing oscillation for vibrating both the vibrators 11 and 21.

In this case, the one vibrator 11 receiving its own monitoring signals is able to vibrate with large amplitude, because the vibrator 11 is allowed to vibrate at its own resonance frequency by the driving signals based on the self monitoring signals, thereby providing a sufficient-amplitude monitoring output to the self-energizing oscillator 30.

In addition, the same driving signals as those fed to the one vibrator 11 are also fed to the remaining vibrator 21. Because detection sensitivity to the acceleration has no reliance on the vibrational amplitude, the fact that both the vibrators 11 and 21 vibrate at different vibrational amplitudes has no influence on the canceling effect for the acceleration sensitivities.

The above comparative explanation will now be detailed with reference to FIGS. 3 to 5.

As described, the self-energizing oscillator 30 produces a driving signal for the vibrators 11 and 21 at a frequency realized when there is a phase difference of 90 degrees between the driving signal and the vibrations of the vibrators 11 and 21. It is therefore required that the phase difference of the monitoring signals from the vibrations of the vibrators be 90 degrees.

Figure 3:
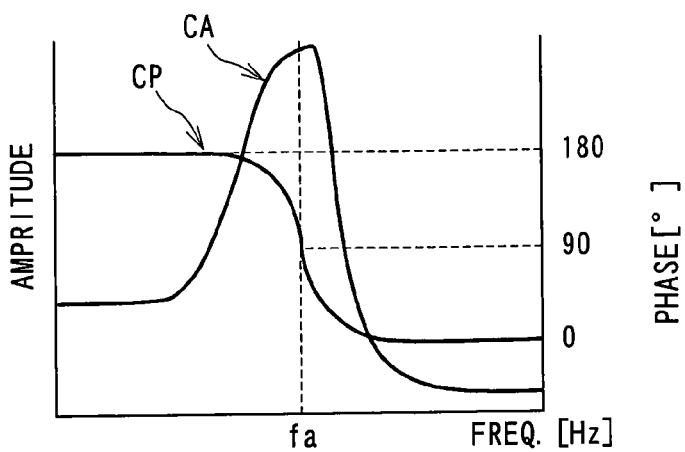
FIG. 3 is a frequency characteristic of an ordinary vibrator to be used in the two-vibrator type of micro gyro sensor.

FIG. 3 exemplifies the vibrational characteristic of an ordinary vibrator, in which there are shown two curves. One curve CP shows the vibrational amplitude of the vibrator, while the other curve CA shows a phase difference from a driving signal to drive the vibrator. The self-energizing oscillator 30 is required to oscillate so as to provide a driving signal of amplitude as large as possible in order to make the vibrators vibrate at a frequency of "fa [Hz]," that is, a resonance frequency of the vibrator. The phase difference is 90 degrees at the frequency "fa." Hence the self-energizing oscillator 30 operates to be settled at the frequency "fa," at which the oscillator produces the driving signal.

The vibrating state of a vibrator is measured based on signals from monitoring electrodes attached to the vibrator. In the conventional two-vibrator type of micro gyro sensor 1, the monitoring signals from the two vibrators 11 and 21 are mutually combined to produce the driving signals for the self-energizing oscillation. If the respective resonance frequencies of the two vibrators 11 and 21 are completely the same, the frequency characteristic of each of the vibrators 11 and 21 becomes equivalent to that shown in FIG. 3.

Figure 4:
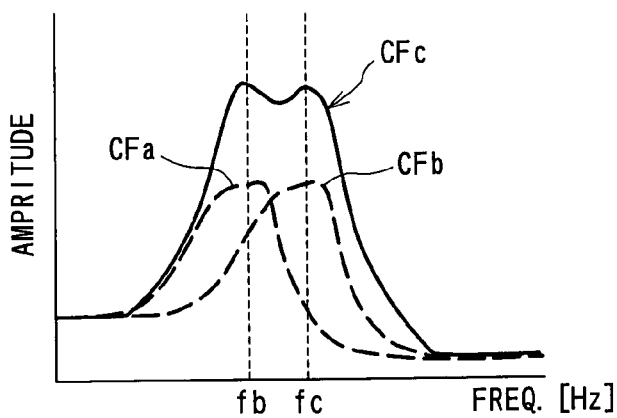
FIG. 4 is a frequency characteristic of amplitude of the conventional two-vibrator type of micro gyro sensor, which is introduced to explain the advantage of the present invention.

However, in cases where there are irregularities in the frequency characteristics of the two vibrators 11 and 21, the resonance frequencies "fb and fc" thereof are different from each other, as shown in FIG. 4. In this case, the respective frequency characteristics CFa and CFb of both the vibrators 11 and 21 are combined to each other to form a combined frequency characteristic CFc. The combined frequency characteristic is reflected into the monitoring signals acquired from the vibrators 11 and 21. Similarly, in the conventional sensor configuration shown in FIG. 1, phase characteristics can be shown in FIG. 5, in which curves CPa and CPb denote the phase characteristic of each of the vibrators 11 and 21, respectively, and a curve CPc denotes a combined one of both the phase characteristics CPa and CPb. Thus the entire sensor 1 also operates on the combined phase characteristic.

Figure 5:
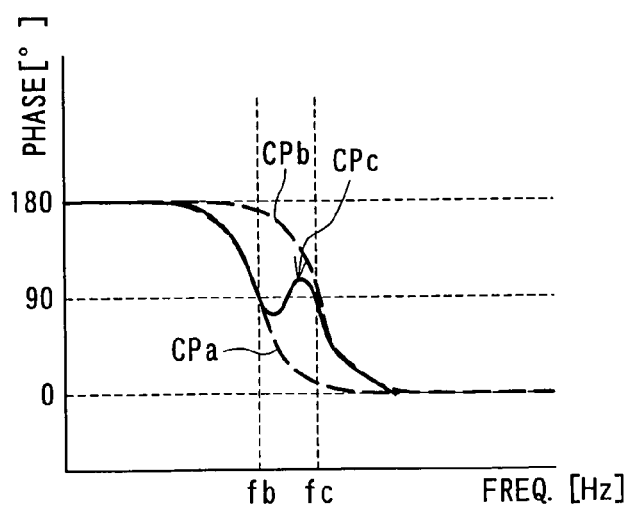
FIG. 5 is a frequency characteristic of phase of the conventional two-vibrator type of micro gyro sensor, which is introduced to explain the advantage of the present invention.

As can be seen from FIGS. 3 to 5, as the respective resonance frequencies of the two vibrators 11 and 21 become different from each other, there appear clearly two resonance peaks at each of which the phase difference becomes 90 degrees. These separated two resonance peaks confuse the self-energizing oscillator 30 as to at which frequency the oscillator 30 should be resonated, failing in the resonance operation.

By contrast, the present two-vibrator type of micro gyro sensor 2 according to the present invention is able to remove the above difficulty. To perform such a removal, the sensor 2 is configured to receive at any time the monitoring signals from the one-side vibrator (in the foregoing embodiment, the vibrator 11) and drive both the vibrators 11 and 21 based on a single response frequency of the detected monitoring signals from the one-side vibrator. Therefore, the resonance frequency given to the self-energizing oscillator 30 is always one in number, so that this one-side monitoring configuration prevents the oscillator 30 from failing in its self-oscillation.

Incidentally, the vibrational amplitude of the remaining vibrator (in the embodiment, the vibrator 21) which is irrespective of monitoring is lowered, because the vibrator is forced to vibrate at a frequency different resonance frequency. However, this has no influence on the cancellation of acceleration sensitivity yielded from combining the two vibrators 11 and 21.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2003-088340 filed on Mar. 27, 2003 including the specification, claims, drawings and summary is incorporated herein by reference in its entirety.

What is claimed is:

1. An oscillation type of micro gyro sensor, comprising:
two vibrators each having an individual resonance frequency and having a plurality of movable electrodes disposed on both sides of each vibrator in a specified direction;
a pair of monitoring electrodes disposed to monitor vibration of only one of the two vibrators to output a signal indicative of the monitored vibration and disposed to be opposed, with a gap, to part of the movable electrodes on both sides of the only one of the two vibrators respectively in the specified direction, the gap forming a capacitance having changes which are reflected in the signal from the monitoring electrodes;
a pair of driving electrodes disposed to be opposed to part of the movable electrodes on both sides of each of the two vibrators respectively in the specified direction, the pair of driving electrodes driving each of the two vibrators responsively to two driving signals of mutually opposite phases;

a signal processor receiving the signal from the pair of monitoring electrodes to provide the two driving signals to be sent respectively to the pair of driving electrodes of each of the two vibrators, by using the signal received from the pair of monitoring electrodes.

2. The gyro sensor according to claim 1, wherein an other one of the two vibrators has a second pair of monitoring electrodes on both sides of the vibrator in the specified direction, no electrical connection being made from the second pair of monitoring electrode to the signal processor.

3. The gyro sensor according to claim 2, wherein said signal processor is provided with a differential amplifier receiving the signal from the pair of monitoring electrodes, a self-energizing oscillator self-oscillating based on a signal outputted from the differential amplifier, and an inverter inverting an oscillation signal outputted from the self-energizing oscillator into an inverted signal serving as one of the two driving signals, the other of the two driving signals being composed of the oscillation signal itself outputted from the self-energizing oscillator.

* * * * *